UNITED STATES PATENT OFFICE.

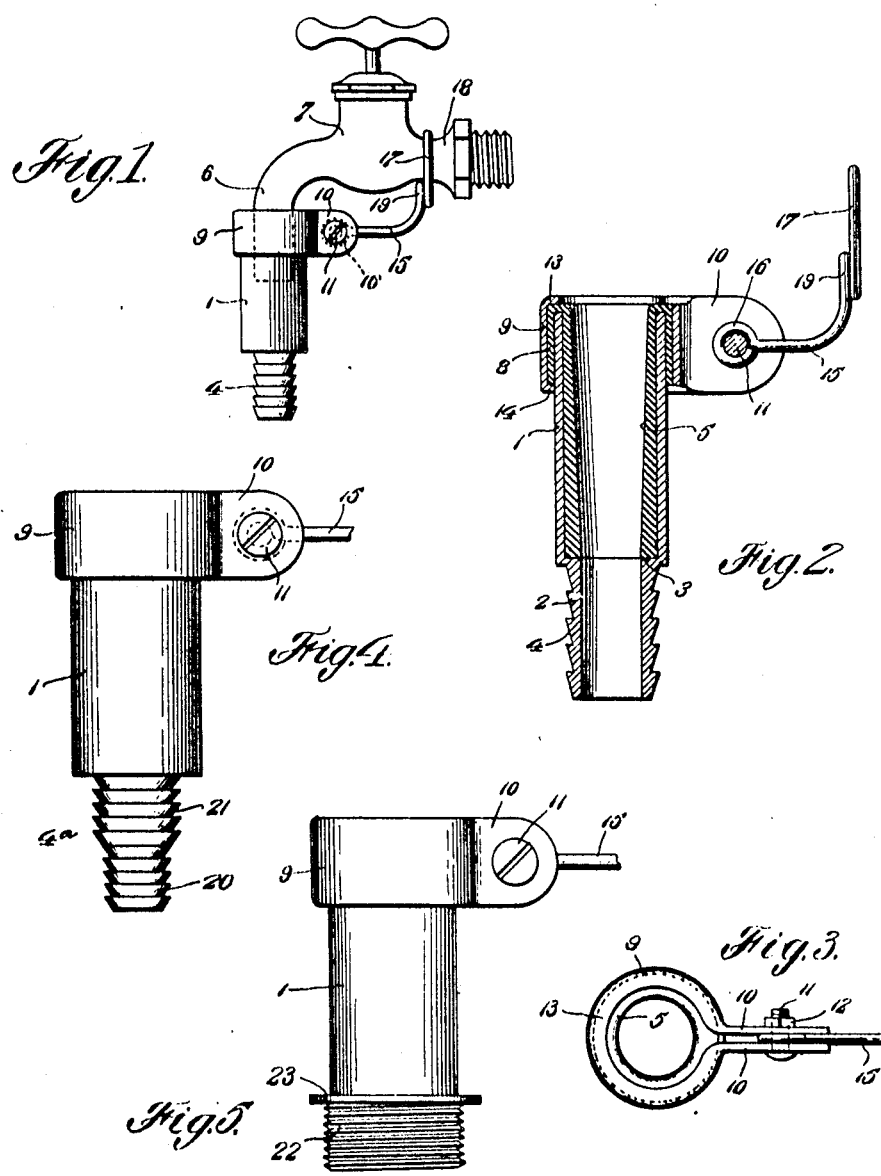

LEO COATES, OF PITTSBURGH, PENNSYLVANIA.

HOSE-COUPLING.

1,050,615.
Specification of Letters Patent.
Patented Jan. 14, 1913.

Application filed August 23, 1911. Serial No. 645,472.

*To all whom it may concern:*

Be it known that I, LEO COATES, a citizen of the United States, residing at Pittsburgh, in the county of Allegheny and State of Pennsylvania, have invented new and useful Improvements in Hose-Couplings, of which the following is a specification.

This invention relates to hose couplings or connections and particularly to a connection for coupling a rubber hose or pipe to a water discharge faucet or spigot.

The object of the invention is to provide a device of this character which is simple of construction, inexpensive of production, adapted to secure the hose firmly in position, and capable of being readily applied and removed and of engaging faucets or spigots varying to some extent in size or shape.

A further object of the invention is to provide a device of this character which is adapted for engagement with different sizes of hose tubes or pipes.

The invention consists of the features of construction, combination and arrangement of parts, hereinafter fully described and claimed, reference being had to the accompanying drawings, in which—

Figure 1 is a side elevation of a faucet, showing the application of the invention. Fig. 2 is a central vertical section through the coupling or connection. Fig. 3 is a top plan view of the same. Fig. 4 is a side view of a modified form of connection adapted for engagement with two sizes of hose. Fig. 5 is a similar view of another modified form of connection adapted for engagement with a removable nipple section.

The coupling or connection comprises a tubular body or casing 1 having at its lower end a contracted nipple 2 forming a flange or shoulder 3 and provided with external annular bevel faced ribs 4 over which the end of the hose is designed to be slipped and wired or otherwise secured in position. Lining said body or casing is a tubular rubber gasket 5 adapted to engage and receive the discharge nozzle 6 of the faucet or spigot 7. The lower end of this gasket bears against the shoulder 3 and said gasket is internally tapered for a firm frictional engagement with the nozzle 6. In order to hold the gasket firmly in position, the upper end of said gasket is turned outwardly to form a cuff 8 which incloses the upper end of the body or casing and is clamped against the same by a split clamping member or ring 9, the ends 10 of which are perforated for the passage of a bolt 11 provided with a retaining nut 12, whereby the clamping ring may be drawn as tightly as desired to clamp the sleeve in position. The said clamping member or ring 9 is provided with inturned upper and lower flanges 13 and 14 to bear against the extremities of the cuff and prevent the cuff from slipping or the gasket from becoming displaced in the application and removal of the connection to and from the nozzle of the faucet. To further assist in holding the connection in place, a latch member is provided which is formed of a single piece of spring wire having an end or arm 15 provided with an eye 16 pivotally engaging the bolt 11 between the ends of the clamping ring, and having its opposite end or arm bent at right angles to the arm 15 and formed to provide a hook to engage the inlet neck 18 of the faucet or spigot, whereby the latch is pivotally connected with the clamping ring so that the hook is adapted through its pivotal connection and spring action to be adjusted to slide and snap over the neck 18 to fasten the connection in place against possibility of casual displacement. The extremity of the hook is formed to provide a finger piece for convenience in manipulating and the intermediate portion of the latch is provided with a spring coil 19 adapted to permit the hook to have an increased range of motion longitudinally and laterally for engagement with the inlet necks of different sized faucets, or faucets in which the necks vary in length and diameter. It will be seen that the construction described provides for the ready and quick application and release of the connection and its firm and secure retention in place to hold the hose in place for service. The clamping ring may be removed from the body or casing at any time when it is desired to detach an old gasket and apply a new one.

In the construction shown in Fig. 4 a ribbed nipple 4ᵃ having portions 20 and 21 of different diameters is provided for the application of two different sizes of hose pipes, thus obviating the necessity of employing different sizes of connections for the two sizes of hose pipes most commonly used.

In Fig. 5 the body or casing 1 is shown provided with a threaded end 22 and abutment flange 23, whereby threaded nipples of different sizes may be applied to one and the same connection for the attachment thereto of different sized hose pipes.

Having thus described the invention, what I claim as new is:

A hose connection comprising a tubular gasket interiorly seated in a tubular retainer, said tubular retainer having a reduced, ribbed and hose holding nipple, and a flanged clamping band with a wire bracket latch member, said latch member having a spigot clamping portion, a spring coil tension portion and an eyelet connection portion, said connection portion being clamped between the ends of said flanged clamping band, substantially as specified.

In testimony whereof I affix my signature in presence of two witnesses.

LEO COATES.

Witnesses:
E. EDMONSTON, Jr.,
C. M. GIBSON.

Copies of this patent may be obtained for five cents each, by addressing the "Commissioner of Patents, Washington, D. C."